United States Patent [19]
Link et al.

[11] Patent Number: 6,038,948
[45] Date of Patent: Mar. 21, 2000

[54] WORKPIECE SPINDLE DEVICE FOR A MACHINE TOOL

[75] Inventors: Helmut Friedrich Link, Aichwald; Günther-Heinrich Trautmann, Kirchheim, both of Germany

[73] Assignee: Index-Werke GmbH & Co. KG Hahn & Tessky, Esslingen, Germany

[21] Appl. No.: 09/266,170

[22] Filed: Mar. 10, 1999

Related U.S. Application Data

[63] Continuation of application No. PCT/EP97/04896, Sep. 9, 1997.

[30] Foreign Application Priority Data

Sep. 13, 1996 [DE] Germany .................. 196 37 256

[51] Int. Cl.⁷ ............................................. B23B 19/02
[52] U.S. Cl. ............................. 82/147; 82/165; 82/168; 279/114
[58] Field of Search .................. 82/147, 165, 168, 82/162, 142; 279/114, 119, 120, 126, 134, 141

[56] References Cited

U.S. PATENT DOCUMENTS

| | | | |
|---|---|---|---|
| 3,690,687 | 9/1972 | Moe | 82/147 X |
| 3,771,802 | 11/1973 | Hiramatu et al. | 82/147 X |
| 4,567,794 | 2/1986 | Bald | 82/147 X |
| 4,742,740 | 5/1988 | Hasslauer et al. | 82/147 X |
| 4,790,699 | 12/1988 | Ringel | 82/147 X |
| 5,010,794 | 4/1991 | Klager | 82/147 |
| 5,172,617 | 12/1992 | Rohm | 279/134 X |
| 5,549,427 | 8/1996 | Hiestand | 409/233 |

FOREIGN PATENT DOCUMENTS

| | | |
|---|---|---|
| 0 440 096 A1 | 1/1991 | European Pat. Off. |
| 0 440 096 B1 | 1/1991 | European Pat. Off. |
| 0 657 238 A1 | 10/1994 | European Pat. Off. |
| 2 675 230 | 4/1991 | France. |
| 38 36 453 A1 | 10/1988 | Germany. |
| 42 32 234 C1 | 9/1992 | Germany. |
| 42 36 270 A1 | 10/1992 | Germany. |
| 42 37 901 A1 | 10/1992 | Germany. |
| 001611543 | 12/1990 | U.S.S.R. ............... 82/147 |

*Primary Examiner*—Henry W. H. Tsai

[57] ABSTRACT

A workpiece spindle device for a machine tool having a drivable workpiece spindle in a spindle housing and including a hydraulic oil supply device with a non-rotating housing portion connected to the spindle housing. An oil control device is connected to the non-rotating housing and communicated to the oil supply device without an oil line therebetween. An oil flow path is provided between the oil control device and a cylinder chamber of a workpiece clamping cylinder of the spindle with the oil path being free of any valve and thus substantially unrestricted to oil flow.

14 Claims, 2 Drawing Sheets

WORKPIECE SPINDLE DEVICE FOR A MACHINE TOOL

This is a continuation of international PCT application No. PCT/EP97/04896 having international filing date of Sep. 9, 1997, which designates the United States.

BACKGROUND OF THE INVENTION

In order to hold a workpiece to be machined on or in a workpiece spindle of a machine tool during the machining, a workpiece gripping system is required with a power-operated clamping device rotating with the workpiece spindle. The most widely used are hydraulically actuated clamping devices in the form of a so-called chuck which is attached to the front end region of the workpiece spindle and is closed for gripping a workpiece and opened for releasing the workpiece by means of a hydraulically actuated clamping cylinder. The clamping cylinder has a cylinder housing which is securely connected to the workpiece spindle and in which a piston in operative connection with the chuck can be displaced back and forth in the direction of the spindle axis in that either one or other of the sides of the piston is acted upon with pressure oil or with another pressure medium. In principle, it is, however, also conceivable, of course, for the chuck to open due to the action of one or more springs and for the piston of the clamping cylinder to be acted upon with pressure oil only from one side in order to overcome the action of this spring or these springs and to close the chuck. The pressure medium, generally hydraulic oil, is supplied to the rotating clamping cylinder and thus to the cylinder chamber located on the one side of the piston or to the cylinder chambers located on both sides of the piston via a (hydraulic oil) supply device in the form of a so-called rotary supply; a rotary supply to clamping cylinders of a conventional construction has an outer, non-rotating housing portion annularly surrounding the spindle axis and having two oil channels as well as an inner housing portion which rotates with the workpiece spindle and thus with the cylinder housing of the clamping cylinder and likewise has two oil channels, is surrounded by the outer housing portion and, where applicable, is formed by the cylinder housing of the clamping cylinder, wherein the one oil channel of the inner housing portion communicates with the one cylinder chamber and the one oil channel of the outer housing portion, the other oil channel of the inner housing portion with the other cylinder chamber and the other oil channel of the outer housing portion. An oil pump feeds the hydraulic oil via an oil control device to the rotary supply and thus to the clamping cylinder with the pressure required for a secure gripping of the workpiece; generally, the clamping cylinder is also acted upon with pressure oil via the rotary supply and the oil control device in order to open the chuck again. All these procedures are, like the drive for the workpiece spindle, controlled by the machine tool control, which is normally designed as a computerized numerical control and with which monitoring devices and regulating devices of the oil control device also communicate in order to monitor and regulate the oil pressure.

On account of the often high rotational speeds of the workpiece spindle, in particular, of the workpiece spindles of lathes and the considerable machining forces acting on the workpieces, the workpiece gripping systems must meet the highest safety requirements: The oil pressure on the one side of the piston of the clamping cylinder causing the gripping of the workpiece in the clamping device of the workpiece spindle must be constantly monitored, and when the supply of the gripping system with the pressure medium fails or takes place with too low a pressure, a clamping force sufficient to securely hold the workpiece must be maintained over a period of time which is long enough for the machine control to be able to bring the rotating workpiece spindle to a stop with any certainty since, otherwise, a workpiece could be catapulted away from the workpiece spindle with a high kinetic energy.

A reliable maintenance of the required gripping force is achieved in the known gripping systems in that two releasable check valves are provided in the double-acting clamping cylinder (i.e. the piston of which can be acted upon with the pressure medium from both directions) rotating with the workpiece spindle, namely one check valve in each of the two flow paths extending in the cylinder housing and leading to a respective side of the piston so that when the supply of pressure medium fails a pressure set beforehand can be maintained in each of the two cylinder chambers. The gripping system, its control and the check valves are designed such that the clamping device may be opened only when the workpiece spindle is stationary, wherein that check valve which is located in the flow path responsible for the closing of the clamping device is released and opened by the pressure built up in the other flow path for the opening of the gripping device (the same applies for the reverse case).

Such releasable check valves are, however, not only relatively complicated but they also have considerable functional disadvantages: As a result of their construction they restrict the flow of the pressure medium to a much greater extent than a simple, conventional check valve which results in the clamping device being closable and openable only relatively slowly; in order to shorten the actuating time for the clamping device, known gripping systems have for each flow path of the clamping cylinder several such releasable check valves connected in parallel to one another in order to reduce the total flow rate resistance. Since, in the case of known gripping systems with releasable check valves, the latter may be released and opened only when the workpiece spindle is stationary, it is not possible to reduce the clamping pressure or the gripping forces exerted on the workpiece by the clamping device while the workpiece spindle is rotating when a fine machining of the workpiece with a lesser clamping force could take place after a coarse machining, during which the workpiece must be held with a high clamping force in view of the high machining forces exerted on the workpiece, in order to reduce the workpiece deformations caused by high clamping forces for the fine machining which requires a great precision. Finally, the known gripping systems with releasable check valves in the clamping cylinder make it impossible to continuously alter the pressure prevailing in the clamping cylinder on the one side of the piston as a function of the rotational speed of the workpiece spindle in order to compensate for the centrifugal forces acting, for example, on the clamping jaws of a chuck—such a compensation possibility would allow the clamping forces actually acting on the workpiece to be kept constant irrespective of the rotational speed of the workpiece spindle and the workpiece deformations caused by the clamping forces to be reduced in this way. As is apparent from the preceding explanations, a reduction in the clamping pressure and thus in the clamping forces may be brought about in the known gripping system as described only with a considerable expenditure of time since, first of all, the workpiece spindle must be stopped, then the gripping device opened and the latter finally closed again with a reduced clamping pressure; in this respect, the workpiece must also be prevented from falling out of the clamping device by way of a pressing mechanism. Such a procedure does, however, also entail the additional risk of the exact clamping position of the workpiece which is decisive for an exact final machining to become lost when the workpiece is displaced somewhat in relation to the clamping device when this is open.

Finally, the known, releasable check valves are also not absolutely reliable in their functioning: They are certainly tested for leaks when they are new but there is no practical possibility to carry out such testing during the working time of the machine tool. Consequently, it cannot be ruled out that the check valve will lose its tightness as a result of dirt or gum formation in the hydraulic oil customarily forming the pressure medium, and even the slightest leak leads to an immediate drop in the clamping pressure when the supply of pressure medium fails—in this connection it must be kept in mind that the known rotary supplies unavoidably leak to a quite considerable extent and so a leaky check valve leads to an immediate drop in the clamping pressure on account of these leakage losses.

FR-PS 2 675 230 describes a gripping system with releasable check valves in the clamping cylinder which does, however, make a reduction in the pressure prevailing in the clamping cylinder possible when the workpiece spindle is running. For this purpose, pressure valves are built in parallel to the releasable check valves of the clamping cylinder and they open at a minimum clamping pressure of, for example, 10 bars, remain open at a higher pressure and then each form a bypass to the associated check valve, wherein the bypass is designed such that it causes a strong restricting effect. In the case of a sudden loss of pressure to below the value of the minimum clamping pressure specified above, these pressure valves close quickly enough in order to at least more or less maintain the high pressure prevailing in the relevant cylinder chamber thanks to the restricting effect of the bypass line. In the case of a slow drop in pressure, the pressure in the relevant cylinder chamber can, however, sink as far as the specified minimum clamping pressure; such a slow drop in pressure may be desired to take place in order to reduce the clamping force; it can, however, also be caused by a functional error in the supply of pressure medium, e.g. as a result of a leakage occurring during operation in a hose connecting line, and since a differentiation between these two cases is not possible, the workpiece may be catapulted out of the clamping device during a functional error in the supply of pressure medium.

In the case of the clamping cylinders of a conventional construction as described above and provided with a so-called rotary supply (hydraulic oil supply device for supplying and carrying away hydraulic oil to or from the rotating cylinder housing of the clamping cylinder) the outer, non-rotating housing portion of the rotary supply accommodates at least two bearings which are arranged at a distance from one another in the direction of the spindle axis and with the aid of which an inner housing portion of the rotary supply, which rotates with the clamping cylinder housing, is mounted in its outer housing portion, and the outer housing portion of the rotary supply is prevented from rotating with it by means of stationary stops.

The oil control device, via which the oil inflow and outflow to or from the rotary supply is controlled, is connected to the rotary supply in the case of all the known constructions via two flexible hose lines and includes a pressure oil storage device chargeable by the oil pump mentioned above, a pressure regulating valve located between the storage device and the rotary supply for regulating the oil pressure prevailing at the clamping device, as well as a check valve located between pressure oil storage device and oil pump to prevent undesired losses in pressure (if the unavoidable leakage losses in the rotary supply are disregarded). Such an oil control device fed from an oil pump results, for example, from DE-42 37 901-C2.

SUMMARY OF THE INVENTION

The invention deals with a workpiece spindle device for a machine tool having a drivable workpiece spindle, which is mounted in a spindle housing for rotation about a spindle axis and is provided with a power-operated clamping device for gripping a workpiece to be machined, and a hydraulic actuating device for the clamping device, which has a hydraulic clamping cylinder with a cylinder housing securely connected to the workpiece spindle as well as a piston displaceable in a cylinder chamber of the cylinder housing in the direction of the spindle axis and being in operative connection with the clamping device, wherein a hydraulic oil supply device is associated with the clamping cylinder, this supply device having an outer, non-rotating housing portion and connecting at least one oil channel provided in the cylinder housing to an oil control device controlling the flow of hydraulic oil from a pressure oil source via an oil flow path to a cylinder chamber of the clamping cylinder, and the oil control device has a pressure regulating valve located between the pressure oil source and the oil supply device as well as a pressure oil storage device between the pressure regulating valve and the pressure oil source and, upstream of the pressure oil storage device, a check valve for preventing undesired pressure losses of the clamping cylinder. In view of the above comments, it goes without saying that another suitable pressure medium can be used instead of hydraulic oil, that the cylinder housing of the clamping cylinder need not be connected directly to the workpiece spindle, that the clamping cylinder can be a double-acting cylinder and, consequently, the cylinder housing can have several oil channels and that the hydraulic oil supply device could be designed as a conventional rotary supply as described above.

The object underlying the invention was to design such a workpiece spindle device such that it ensures not only a high operational safety but makes an optional alteration of the clamping force possible while the workpiece spindle is rotating, namely with the use of a clamping cylinder which is of a more simple construction than the known clamping cylinder described above and having releasable check valves and bypass paths including pressure valves.

To accomplish this object, it is suggested in accordance with the invention (a) to connect the non-rotating housing portion of the oil supply device and the spindle housing securely to one another, (b) to connect the oil control device securely to the non-rotating housing portion of the oil supply device and for this to be communicated to the oil supply device without any oil line therebetween and (c) to design the oil flow path between the oil control device and the cylinder chamber without any valve.

As a result, the following advantages, in particular, may be achieved:

Since the clamping cylinder does not include any check valve or check valves and the check valve included in the oil control device is located upstream of the unavoidably leaking oil supply device, i.e., for example, of the known rotary supply described above, a lower clamping pressure may also be regulated with the pressure regulating valve of the oil control device when the workpiece spindle is running, particularly a clamping pressure not dependent on the rotational speed, although the check valve included in the oil control device can be a quite simple, conventional check valve.

Since, in the case of the inventive device, the non-rotating housing portion of the oil supply device is borne by the spindle housing, the invention creates the preconditions for connecting the oil control device, which normally has a not inconsiderable weight, securely to the oil supply device, i.e., in particular, have this likewise borne by the spindle housing, which has an additional, quite substantial advantage with respect to the operational safety:

The oil control device may be connected to the oil supply device without any line so that the usual, flexible hose connecting lines between oil control device and oil supply device are not required, even when the workpiece spindle is arranged with the spindle housing mounting it on a displaceable machine slide.

Moreover, the invention leads to comparatively short oil channels between the pressure regulating valve and the clamping cylinder, for which reason the clamping device of an inventive workpiece spindle device can be closed and opened quickly, even at the smallest clamping pressures. As a result of the short flow paths and the fact that no safety check valves are required in the clamping cylinder, whereby these flow paths are practically unrestricted, no pressure peaks acting disadvantageously on the workpiece, in particular, result in the clamping cylinder during an increase in the clamping pressure.

Despite the unavoidable leakage of the hydraulic oil supply device located between clamping cylinder and check valve, it may be ensured that the required clamping pressure is maintained, even when the oil pump fails, over that period of time which is required to stop the rotating workpiece spindle since these leakage losses may be compensated by a pressure oil storage device dimensioned to be adequately large or by a second oil pump.

Finally, in preferred embodiments of the inventive workpiece spindle device the workpiece spindle, the spindle housing mounting this, the clamping cylinder, its oil supply device and the oil control device together with pressure regulating valve, check valve and pressure oil storage device can form a complete, operable constructional unit which is easy to assemble and test, above all when the workpiece spindle is a so-called motor spindle, with which the spindle drive motor is integrated into the workpiece spindle.

Attention is also drawn to the fact that an inventive workpiece spindle device allows the clamping pressure to be constantly altered as a function of the rotational speed of the workpiece spindle in order to compensate for the centrifugal forces acting on the clamping elements of the clamping device, in any case when the clamping device has a low hysteresis, as is the case, for example, with the known chucks designed as so-called lever chucks.

When the oil control device, as is the case in preferred embodiments of the inventive device, has a pressure sensor upstream of the check valve, the oil pressure prevailing at the input side of the oil control device may be monitored with this, in particular the functioning of an oil pump supplying the device with hydraulic oil as well as the intactness of a connecting line between the pump and the oil control device, which is of special significance when the device is arranged on a slide of the machine tool and, consequently, a flexible hose line is required as connecting line. In order to also exclude the risks involved with a breakdown in this pressure sensor—such a breakdown could otherwise not be ascertained—, it is recommended to provide two pressure sensors monitoring the oil pressure prevailing at the oil control device upstream of the check valve since these two pressure sensors can then also monitor one another.

In a particularly advantageous embodiment of the inventive device, a throttle serving as an element of a flow monitoring device for a flow of hydraulic oil to the clamping cylinder is provided between the oil supply device and the pressure regulating valve of the oil control device for generating a pressure gradient, a pressure sensor being arranged between the throttle and the oil supply device for carrying out a comparison of the oil pressure prevailing downstream of the throttle with the oil pressure set at the pressure regulating valve. The specified pressure comparison may be carried out in the computerized numerical control of the machine tool so that the computerized numerical control can establish when an appreciable flow of oil is no longer flowing to the clamping cylinder during the course of the gripping of a workpiece (an appreciable drop in pressure also no longer takes place at the throttle), whereupon the computerized numerical control can switch on the drive for the workpiece spindle—the specified pressure comparison can therefore be used to generate an enabling signal for the start of the workpiece spindle.

When the clamping cylinder is a double-acting pressure-medium cylinder, with which the two cylinder chambers of the clamping cylinder located on both sides of the piston can therefore be acted upon alternatingly with the pressure medium in order to close or to open the clamping device, the oil control device has two flow paths, which are connected with the oil supply device and for which a multiway valve is provided in the oil control device for the selective connection of the first or second flow path to the pressure regulating valve and an oil outlet of the oil control device, respectively. In this case, it is recommended to provide not only the first but also the second flow path of the oil control device with a pressure sensor since the following advantages can be achieved as a result: The pressures set at the pressure regulating valve can be constantly and independently controlled with these two pressure sensors not only during the closing but also during the opening of the clamping device; in addition, the two pressure sensors make it possible to monitor the switching position of the multiway valve indirectly since the pressure sensors indicate which side of the clamping cylinder is acted upon with pressure or is pressureless; the efficiency of the pressure oil storage device can also be monitored with the two pressure sensors in each switching position of the multiway valve, and, finally, the two pressure sensors monitor one another since a change in pressure in each of the two flow paths must take place during each actuation of the clamping device.

Particularly advantageous embodiments of the inventive workpiece spindle device have an oil supply device which corresponds in principle to the oil supply device resulting from EP-0 657 239-A, wherein it is recommended that this known oil supply device be improved even further in the manner resulting from the following description as well as the attached claims.

Finally, attention is drawn to the following with respect to the basic principle of the invention as described above: The non-rotating housing portion of the oil supply device need not, of course, be attached directly on the spindle housing since it is only a question of a secure connection, i.e. rigid for practical purposes, between this housing portion and the spindle housing. The same applies with respect to the connection between oil control device and oil supply device. The feature that the oil control device is connected to the oil supply device without any line may not be interpreted so narrowly that as a result, for example, oil bores are excluded in a rigid intermediate member between oil control device and oil supply device the oil control device could also be securely connected to the oil supply device via this intermediate member. As is apparent from the aforesaid, the feature that the oil flow path between the oil control device and a cylinder chamber of the clamping cylinder is to be designed without any valve is intended to express the fact that this oil flow path includes no check valve between the oil control device and the cylinder chamber.

Additional features, details and advantages of the invention result from the attached claims and/or from the following description as well as the attached drawings illustrating a particularly advantageous embodiment of the inventive device; in the drawings:

DESCRIPTION OF THE INVENTION

Figure 1:
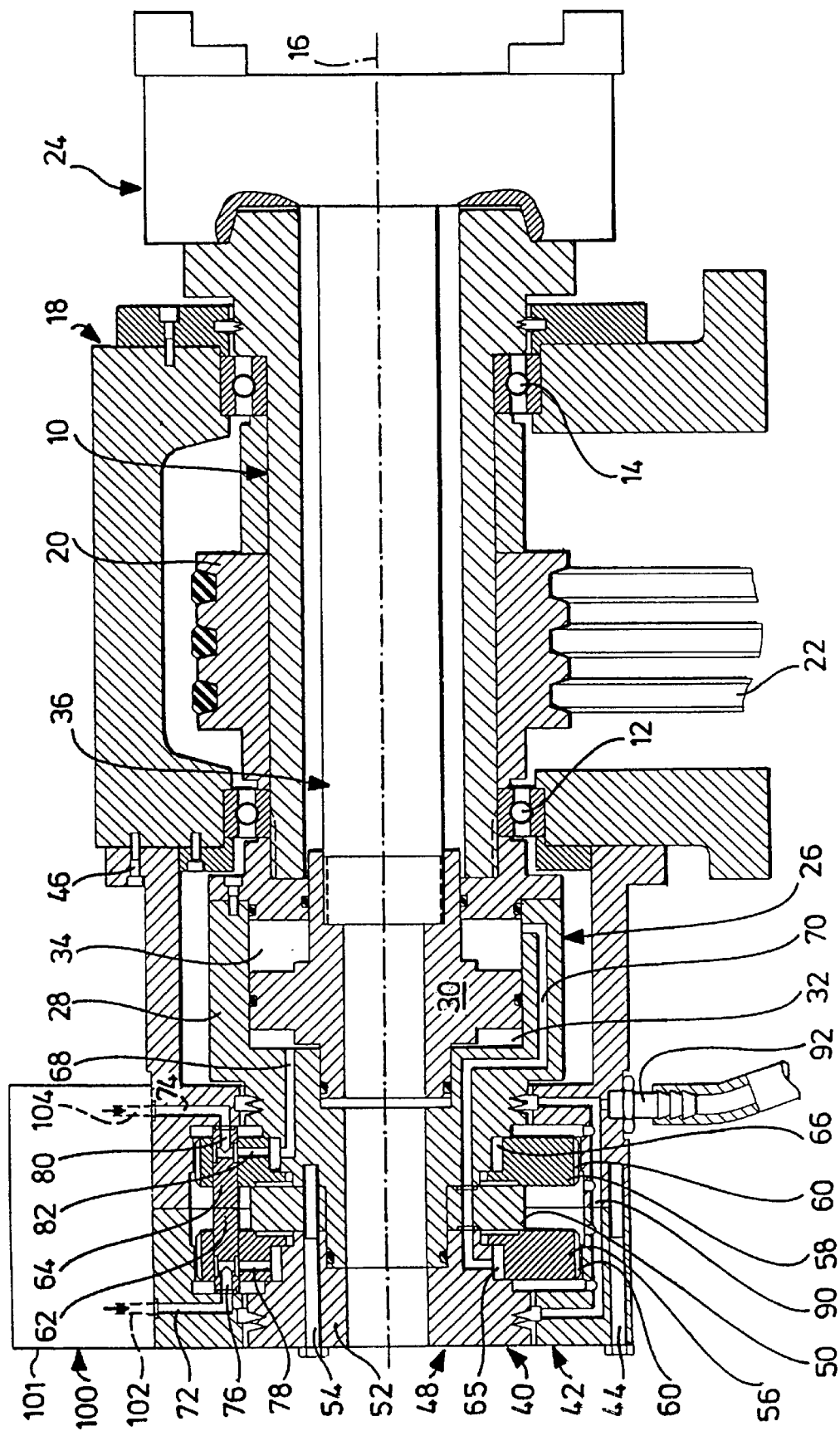
FIG. 1 shows an axial longitudinal section through the workpiece spindle, the spindle housing, the clamping cylinder and the oil supply device together with a schematic illustration of the oil control device.

FIG. 1 shows a workpiece spindle 10 which is designed as a hollow shaft and mounted by means of bearings 12 and 14 in a spindle housing 18 (also called headstock) so as to be rotatable about a spindle axis 16. A belt pulley 20, which is secured on the spindle 10 and over which drive belts 22 extend, serves to drive the workpiece spindle 10 together with a motor for driving the belts 22 which is not illustrated; the workpiece spindle could, however, also be designed as a so-called motor spindle (motor spindles of this type, with which the spindle drive motor is integrated into the workpiece spindle, are known and widely used). The spindle housing 18 together with workpiece spindle 10 can be arranged on a displaceable slide of a machine tool, above all when the workpiece spindle is a motor spindle, but the illustrated embodiment may also be borne by a machine slide when the spindle drive motor which is not shown is likewise arranged on this slide.

A clamping device 24 is secured to the end of the workpiece spindle 10 to the right according to FIG. 1 and has in the illustrated embodiment the shape of a known jaw chuck; a workpiece to be machined may be gripped firmly in this clamping device so that it rotates about the spindle axis 16 with the workpiece spindle 10. A clamping cylinder designated as a whole as 26 is securely connected to the end of the workpiece spindle 10 to the left according to FIG. 1 so that this clamping cylinder also rotates together with the spindle 10 about the spindle axis 16. The clamping cylinder 26 has a cylinder housing 28 consisting of several parts as well as a piston 30 which is guided therein for displacement back and forth in the direction of the spindle axis 16 and by means of which the cylinder chamber formed by the cylinder housing 28 is subdivided into a left and a right cylinder chamber 32 and 34, respectively. A piston rod 36 designed as a pipe coaxial to the spindle axis 16 is securely connected to the piston 30 with its left end according to FIG. 1 whereas its right end is in operative connection with the clamping device 24 in the known and customary manner—since the axial actuation of such a jaw chuck illustrated schematically in FIG. 1 is known, the illustration of details may be dispensed with and so it need only still be mentioned that an axial displacement of the piston rod 36 in the one direction leads to a closure of the clamping device, a displacement in the other direction to an opening of the clamping device.

An oil supply device designated as a whole as 40 is associated with the clamping cylinder 26; oil supply devices of this type are normally designated as rotary supplies and result from, for example, EP-0 657 238-A1 with respect to their fundamental construction. In the case of the illustrated embodiment, the oil supply device 40 has an outer, non-rotating housing portion 42 which is divided into two, is held together by screws 44 and is secured on the spindle housing 18 by means of screws 46. In addition, the oil supply device 40 has an inner housing portion which rotates about the spindle axis 16 with the workpiece spindle 10, has been designated as a whole as 48 and is formed by several individual elements: One of these elements is the cylinder housing 28, a further element is an annular disk member 50 which is designed to be rotationally symmetric with respect to the spindle axis 16, and an annular member 52 likewise designed to be rotationally symmetric with respect to the spindle axis 16 serves to complete the inner housing portion 48. The elements 28, 50 and 52 are held together by screws 54. It should be mentioned that the external circumferential surface of the cylinder housing 28 which is to be added to the oil supply device 40 is likewise designed to be rotationally symmetric with respect to the spindle axis 16. An annular disk member 56 and 58, respectively, is arranged on either side of the annular disk member 50; so that these two annular disk members cannot rotate together with the workpiece spindle 10 but are freely displaceable to a slight extent in the direction of the spindle axis 16, teeth 50 extending in the direction of the spindle axis are provided, namely at the external circumference of each of the annular disk members 56 and 58 as well as at the adjacent internal circumferential areas of the outer housing portion 42. Finally, two cylinder members 62 and 64 extending in the direction of the spindle axis 16 are also provided and these penetrate the annular disk members 56 and 58 with a minimal clearance.

The annular disk member 56 forms together with the annular member 52 a first annular chamber 65 coaxial to the spindle axis 16 and a second, similar annular chamber 66 is located between the annular disk member 58 and the cylinder housing 28. An oil channel 68 is provided in the latter (this and all the other oil channels still to be mentioned in the following are each formed by one or several bores merging into one another) and this connects the left cylinder chamber 32 to the right annular chamber 66. An oil channel 70 extending through the annular member 52, the annular disk member 50 and the cylinder housing 28 connects the right cylinder chamber 34 with the left annular chamber 65. Two oil channels are located in the outer housing portion 42 of the oil supply device, namely a first oil channel 72 and a second oil channel 74, the upper ends of which in FIG. 1 form an oil entry and an oil exit opening, respectively, of the oil supply device 40. Oil channels 76 and 78 in the cylinder member 62 and in the annular disk member 56, respectively, are associated with the first oil channel 72, oil channels 80 and 82 in the cylinder member 64 and in the annular disk member 58, respectively, with the second oil channel 74 so that the first oil channel 72 of the non-rotating, outer housing portion 42 communicates with the left annular chamber 65, the second oil channel 74 with the right annular chamber 66. On account of the annular chambers 65 and 66 extending in a circle around the spindle axis 16, the first oil channel 72 communicates constantly with the right cylinder chamber 34, the second oil channel 74 constantly with the left cylinder chamber 32 although the outer housing portion 42 of the oil supply device 40 does not rotate but the clamping cylinder 26 turns together with the workpiece spindle 10.

As is apparent from FIG. 1, the clamping cylinder 26 in the preferred embodiment is a so-called bearing-less clamping cylinder since the housing 28 of the clamping cylinder 26 is borne by the workpiece spindle 10 mounted with the bearings 12 and 14 and does not have its own mounting and since the outer housing portion 42 of the oil supply device 40 is borne by the spindle housing 18 and not by roller bearings.

Each of the non-rotating annular disk members 56 and 58 forms with the rotating elements of the inner housing portion 48 of the oil supply device 40 three narrow sealing gaps which are located in the illustrated embodiment in planes extending at right angles to the spindle axis 16, can be adjusted to a predetermined gap width measurement during supply of pressure oil (on account of the minimum axial displaceability of the annular disk members 56 and 58) and thus ensure that no contact takes place between stationary and rotating parts of the oil supply device 40; in this connection, reference is again made to EP-0 657 238-A1.

Rotary supplies of this type, such as the oil supply device 40, are never absolutely sealed but lead to a not inconsiderable oil leakage rate of, for example, 30–35 ml/s. As is apparent from FIG. 1, the leaking oil is collected in a channel 90 which is provided in the lower region of the non-rotating, outer housing portion 42 of the oil supply device 40 and from which the leaking oil can exit via a short discharge connection pipe 92 and be returned to the oil pump.

In accordance with the invention, an oil control device 100 which is illustrated only schematically in FIG. 1 is attached directly on the non-rotating, outer housing portion 42 of the oil supply device 40; for this oil control device FIG. 1 merely indicates a first and a second flow path 102 and 104, respectively, for the hydraulic oil which are formed in the region of the periphery of the oil control device 100 by bores in a housing 101 of the oil control device 100 which are intended to be connected to the oil channels 72 and 74 of the outer housing portion 42 of the oil supply device 40 in a manner impervious to pressure oil.

The construction of the oil control device 100 will now be explained further on the basis of FIG. 2.

Figure 2:
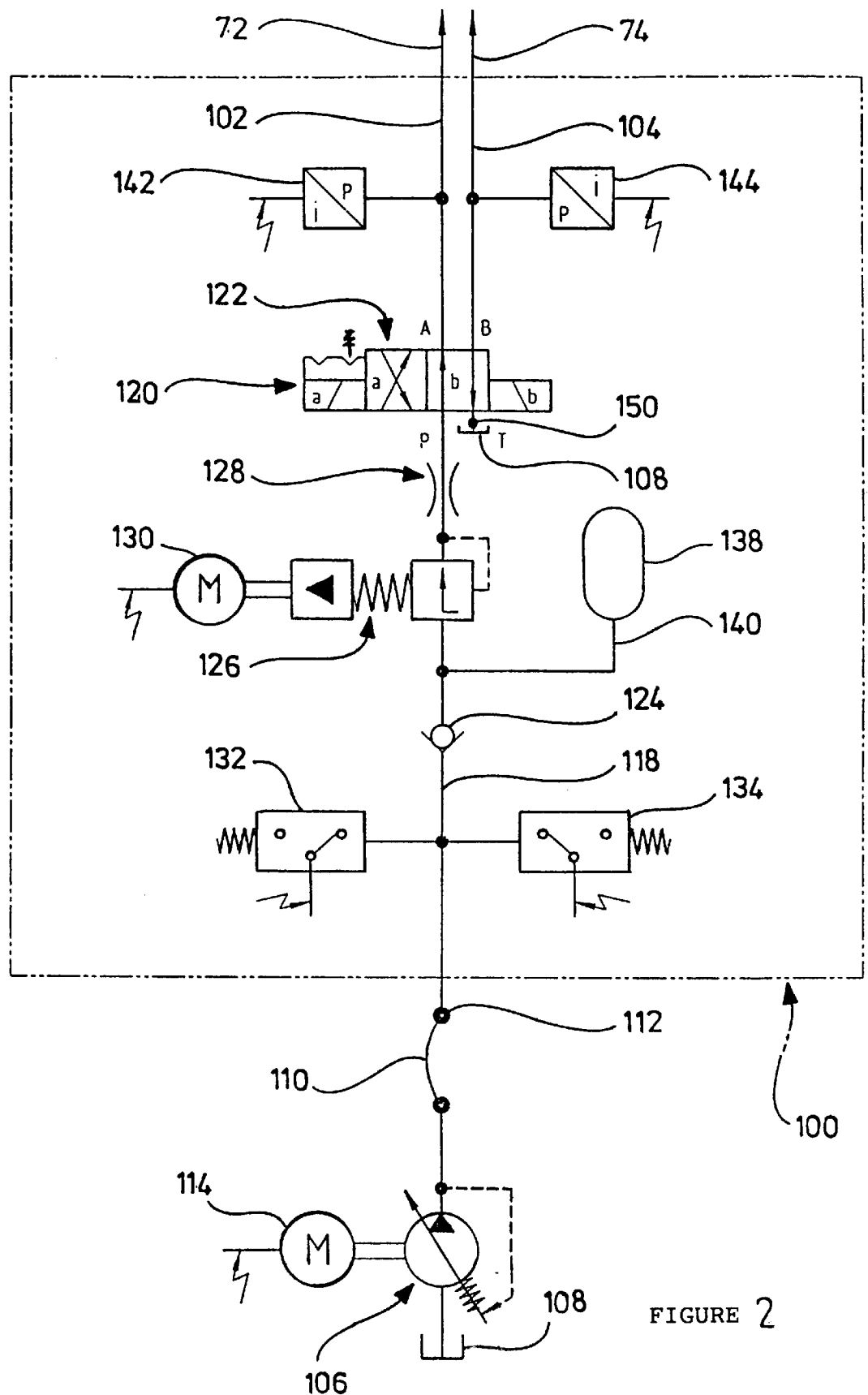
FIG. 2 shows a block diagram of the oil control device.

In FIG. 2, the first and the second oil channels 72 and 74, respectively, of the oil supply device 40 are indicated at the top and these merge into the two oil channels 102 and 104 of the oil control device 100 indicated in FIG. 1. FIG. 2 shows, apart from the oil control device 100, an oil pump which is designated as a whole as 106, draws hydraulic oil from a tank 108 and feeds this into a connecting line 110 which is designed, for example, as a flexible hose line and is connected to the oil control device 100 at a pressure oil inlet 112. As indicated in FIG. 2, the pump 106 is provided with means, with which the maximum feed pressure prevailing at the connecting line 110 may be restricted and adjusted; since means of this type are, however, known to the person skilled in the art and not the subject matter of the present invention, no further explanations in this respect are required. FIG. 2 also shows an electromotor 114 for the drive of the pump 106, this motor being controlled by the computerized numerical control, which is not illustrated, of the machine tool which is likewise not illustrated.

An oil channel 118 leads from the pressure oil inlet 112 to a multiway valve 120, which is, in the illustrated embodiment, a commercially available, hydraulic ½-way valve such as can be purchased, for example, from the company HERION-Werke KG, 7012 Fellbach, Federal Republic of Germany. This multiway valve is actuated electromagnetically, its slide piston (the actual valve member) 122 is displaceable back and forth in a horizontal direction between a left and a right position in accordance with FIG. 2 (wherein FIG. 2 shows the slide piston in its left position), and as has been indicated in FIG. 2 in the left part of the multiway valve 120, the latter is intended to be a notched valve in order to secure the slide piston 122 in its two positions against any unintentional displacement. The electromagnetic actuation of the multiway valve 120 takes place under the control of the computerized numerical control of the machine tool.

The oil channel 118 includes between the pressure oil inlet 112 and the multiway valve 120 and behind or following one another a simple, conventional check valve 124, which prevents any oil return flow downwards in accordance with FIG. 2, a pressure regulating valve designated as a whole as 126 and a schematically illustrated throttle 128 for generating a pressure gradient when the throttle has hydraulic oil flowing through it. The pressure regulating valve 126 is intended to be a commercially available device such as that described, for example, in the information leaflet RIQ edition 1/1996 of the German company REXROTH. Such a pressure regulating valve is adjusted by a motor with hydraulic servo support (the electric adjusting motor has been indicated at 130), namely under the control of the computerized numerical control of the machine tool. Between the check valve 124 and the pressure oil inlet 112, i.e. upstream of the check valve, the oil pressure prevailing in the oil channel 118 is detected by two pressure sensors 132 and 134 which are designed as so-called pressure monitors (pressure switches), are likewise connected to the machine control and thus make it possible to monitor the oil pressure generated by the oil pump 106 and thus the functional efficiency of the pump as well as the connecting line 110; for this purpose, one of the two pressure sensors 132, 134 would, in principle, be adequate; since, however, in this case any error behavior of the single pressure sensor would not be immediately apparent, two redundant pressure sensors are provided at this point so that these two pressure sensors can monitor one another.

A pressure oil storage device 138 is connected to the oil channel 118 via an oil channel 140 between the check valve 124 and the pressure regulating valve 126. This pressure oil storage device is also a device obtainable on the market, into which a pressure medium such as hydraulic oil can be pumped against the pressure of a cushion of gas, wherein the volume of hydraulic oil received by the storage device 138 is separated from the cushion of gas of the storage device, for example, by a flexible membrane.

A pressure sensor 142 and 144, respectively, likewise connected to the machine control is associated with each of the two oil channels 102 and 104 leading away from the multiway valve 120 and with these pressure sensors it is possible inter alia, but not during running operation, to monitor the functional efficiency of the pressure oil storage device 138, namely in each of the two positions of the multiway valve 120—the pressure sensors 142 and 144 then monitor whether the prestressing of the cushion of gas of the pressure oil storage device 138 is still adequate, i.e. whether the pressure oil storage device is in a position to maintain the minimum pressure required for a functional operation of the inventive device at the input of the pressure regulating valve 126 (i.e. downstream of the check valve 124) when a drop in pressure occurs, for whatever reason, at the pressure oil inlet 112. Further functions of the two pressure sensors 142 and 144 will result from the following description of the operation of the inventive device.

Finally, it is apparent from FIG. 2 that an oil outlet 150 indicated beneath the right part of the multiway valve 120 is connected to the tank 108 via a connecting line which has not been illustrated for the sake of clarity of FIG. 2.

Prior to describing the various operations of the inventive device, reference should be made to the fact that a pressure regulating valve adjustable by a motor, such as the pressure regulating valve 126, has in comparison with a so-called proportional pressure regulating valve which is likewise known the decisive advantage that the pressure set with the pressure regulating valve cannot alter when, for example, the electrical supply to the machine tool or also only to the inventive device breaks down or an electrical lead leading to the pressure regulating valve is interrupted.

When a workpiece is gripped in the clamping device 24, the oil pump 106 switched on for this purpose feeds pressure oil via the multiway valve 120 into one of the two oil channels 102, 104, in the position of the multiway valve illustrated in FIG. 2 into the first oil channel 102; which of the oil channels 102, 104 is to be fed with pressure oil in order to close the clamping device 24 depends on its construction, i.e. on whether the piston rod 36 must be moved to the left or to the right in accordance with FIG. 1 for closing the clamping device. The relevant side of the piston 30 of the clamping cylinder 26 is then acted upon with the clamping pressure predetermined by the pressure regulating valve 126. The flow of oil through the throttle 128 effects a drop in pressure at this and so the pressure sensor 142 measures a smaller pressure than the pressure predetermined by the pressure regulating valve 126. When the comparison taking place in the computerized numerical machine control between the pressure measured by the pressure sensor 142 and the pressure predetermined by the pressure regulating valve 126 results in the pressure detected by the pressure sensor 142 being equal to the pressure predetermined by the pressure regulating valve 126 (or almost equal to this pressure when the leakage rate of the oil supply device 40 is taken into consideration), this indicates that the piston 30 is no longer moving, i.e. that the workpiece is gripped in the clamping device 24 with the predetermined clamping pressure; subsequently, the computerized numeral machine control generates an enable signal for the drive of the workpiece spindle 10. During the movement of the piston 30, the oil contained in the cylinder chamber not acted upon with pressure oil is displaced into the tank 108 via the oil channel 104 (in any case with the position of the multiway valve 120 illustrated in FIG. 2), the multiway valve 120 and the oil outlet 150.

The same applies, of course, for the case where a workpiece gripped in the clamping device 24 is intended to be released when the workpiece spindle 10 is stationary and removed from the clamping device; for this purpose, the multiway valve 120 is switched over so that it takes up, for example, its right position according to FIG. 2, in which the oil channel 102 communicates with the oil outlet 150 and the oil channel 104 with the oil channel 118. In this case, the press are detected by the pressure sensor 144 is compared with the pressure predetermined by the pressure regulating valve 126, and an equal pressure indicates that the opening movement of the clamping device 24 has terminated.

The two pressure sensors 142 and 144 do, however, make it possible above all to monitor in any position of the multiway valve 120 whether that pressure which the pressure regulating valve 126 is intended to specify in accordance with the program is actually reached, and this monitoring represents a constant and independent control. FIG. 2 also shows that the two pressure sensors 142 and 144 can be used to monitor indirectly whether the multiway valve 120 actually takes up its switching position predetermined by the control program of the machine tool since the two pressure sensors indicate which side of the piston 30 of the clamping cylinder 26 is acted upon by pressure or is pressure-less. As will be shown by the following, the two pressure sensors 142 and 144 also monitor the operability of the pressure oil storage device 138, and, finally, the two pressure sensors monitor one another since a sudden alteration in the oil pressure takes place in each of the two oil channels 102 and 104 during each actuation of the clamping device 24.

In the following, additional, conceivable cases of a failure in various components will be discussed, for which purpose it is to be noted that cases of this type do occur in practice; as a result of the following comments, it will also be shown that thanks to the invention a machine tool may be operated absolutely reliably with respect to the functioning of the clamping device; every failure will be recognized, whereupon the workpiece spindle 10 is then stopped by the computerized numerical control of the machine tool within a few seconds, particularly in the case of a loss of energy, as well. In this connection, reference is made to the publication "CNC report", edition 2/96 from May 1996 of the company SIEMENS AG, Department of Automation Technology, in D-90327 Nuremberg, namely to the chapter on "SINUMERIK Safety Integrated".

If the supply of pressure medium breaks down, for example, due to a loss of energy, defect of the oil pump 106 or rupture of the connecting line 110, the short time span between the report of the failure by at least one of the two pressure sensors 132 and 134 up to the stoppage of the rotating workpiece spindle 10 is bridged by the pressure oil storage device 138. In the case of the leakage rate of the oil supply device 40 specified above, an oil storage capacity of the pressure oil storage device 138 of 500 ml is sufficient for this.

Pressure storage devices of this type containing a cushion of gas, in particular, a cushion of nitrogen break down mostly on account of a slow loss of gas which leads to the prestressing of the cushion of gas decreasing during the course of time but very slowly. The inventive device now makes it possible to check the state of the pressure oil storage device 138 repeatedly with the aid of the computerized numerical control of the machine tool, namely in the following manner: Each time the hydraulics are switched on (where applicable, as a result of a program specification, for example, every eight hours), the pressure oil storage device 138 is charged by means of the oil pump 106, i.e. oil is pressed into the pressure oil storage device until the operating pressure is reached. Subsequently, the pump 106 is switched off by the machine control. On account of the leakage losses occurring, in particular, in the oil supply device 40, the pressure oil storage device 138 then discharges slowly. The time span detected by the machine control between the switching off of the pump 106 and the point in time, at which the pressure measured with the pressure sensor 142 or 144 (depending on the position of the multiway valve 120) drops below a predetermined boundary value, is a measure for the state of the pressure oil storage device 138, and for a functionally reliable operation of the machine tool this time span must be considerably longer than the maximum braking time for the workpiece spindle 10, i.e. that period of time which is required in order to stop the workpiece spindle rotating with maximum rotational speed. With a decreasing gas tension in the pressure oil storage device 138, the measured time span defined above will become ever shorter until, finally, the pressure oil storage device 138 becomes unusable and has to be replaced.

A machining program for the machine control to be processed with the machine tool also defines the maximum clamping pressure which is required for a machining procedure; whether or not this maximum clamping pressure is reached may be controlled with the two pressure sensors 142 and 144 once the pressure regulating valve 126 has been set beforehand to this pressure.

As a result of the test described above, abnormal leakage losses, for example, in the check valve 124, in the oil supply device 40 or in the pressure regulating valve 126 as well as in the multiway valve 120 may also be ascertained.

The control elements in the oil control device 100 and the structural components of the clamping cylinder 26 can easily be dimensioned so reliably that they cannot break down.

In the case of the inventive device, the following features, in particular, guarantee a reliable operation of the machine tool: hose lines omitted between the hydraulic control elements and the clamping cylinder as well as a rigid connection of the non-rotating parts of the oil supply device 40 to the spindle housing 18.

Owing to the annular disk members 56 and 58 of the oil supply device 40 which are movable but secured against any rotation, the risk of parts of the oil supply device 40 which turn relative to one another becoming blocked by dirt particles in the sealing gaps is reduced, and even if such blocking occurs, this does not result in any spontaneous interruption of the oil supply paths—in the worst case, the workpiece spindle 10 is blocked or it can no longer start up from its stationary state. In addition, wear and tear of the components enclosing the sealing gaps between them is recognized by the inventive device because the oil leakage rate then increases, whereby the drop in pressure at the throttle 128 also increases and this is recognized by the computerized numerical control of the machine tool on account of the continuing comparison of those pressures which are detected by the pressure sensors 142 and 144 or predetermined by the pressure regulating valve 126.

Other security measures could be taken; as already mentioned, a second oil pump could be provided which is automatically taken into operation in a manner controlled by pressure when the oil pump 106 breaks down; in this case, the pressure oil storage device 138 can be omitted. It would also be possible during a lapse in the supply of energy to bridge that period of time which is required to stop the workpiece spindle in that the energy generated by the workpiece spindle during braking as a result of the action of its drive as generator is used for further operation of the oil pump until the workpiece spindle is brought to a standstill.

We claim:

1. A workpiece spindle device for a machine tool having a drivable workpiece spindle mounted in a spindle housing for rotation about a spindle axis, said workpiece spindle being provided with a power-operated clamping device for gripping a workpiece to be machined, and a hydraulic actuating device for the clamping device, said actuating device having a hydraulic clamping cylinder with a cylinder housing securely connected to the workpiece spindle as well as a piston displaceable in a cylinder chamber of the cylinder housing in the direction of the spindle axis and being in operative connection with the clamping device, wherein a hydraulic oil supply device is associated with the clamping cylinder, said hydraulic oil supply device having an outer, non-rotating housing portion and connecting at least one oil channel provided in the cylinder housing to an oil control device controlling the flow of hydraulic oil from a pressure oil source via an oil flow path to a cylinder chamber of the clamping cylinder, and the oil control device has a pressure regulating valve located between the pressure oil source and the oil supply device as well as a pressure oil storage device between the pressure regulating valve and the pressure oil source and, upstream of the pressure oil storage device, a check valve for preventing undesired pressure losses of the clamping cylinder, wherein (a) the non-rotating housing portion of the oil supply device and the spindle housing are securely connected to one another, (b) the oil control device is securely connected to the non-rotating housing portion of the oil supply device and is communicated to the oil supply device without any oil line therebetween, and that (c) the oil flow path between the oil control device and the cylinder chamber is free of a valve and therefore substantially unrestricted.

2. The workpiece spindle device as defined in claim 1, wherein the oil control device has a housing provided with oil channels and the non-rotating housing portion of the oil supply device has at least one oil channel directly connected to one of the oil channels of the oil control device.

3. The workpiece spindle device as defined in claim 2, wherein the non-rotating housing portion of the oil supply device is attached directly on the spindle housing and the housing of the oil control device is attached directly on the non-rotating housing portion of the oil supply device.

4. The workpiece spindle device as defined in claim 1, wherein a pressure sensor is provided upstream of the check valve for monitoring the oil pressure prevailing at the oil control device.

5. The workpiece spindle device as defined in claim 4, wherein two pressure sensors monitoring the oil pressure prevailing at the oil control device are provided upstream of the check valve, each of said pressure sensors also monitoring the oil pressure prevailing at the other one of said pressure sensors.

6. The workpiece spindle device as defined in claim 1, wherein a throttle serving as an element of a flow monitoring device for a flow of hydraulic oil to the clamping cylinder is provided between the oil supply device and the pressure regulating valve for generating a pressure gradient and wherein a pressure sensor is arranged between the throttle and the oil supply device for carrying out a comparison of the oil pressure prevailing downstream of the throttle with the oil pressure set at the pressure regulating valve.

7. The workpiece spindle device as defined in claim 1, wherein the piston of the clamping cylinder defines a respective partial cylinder chamber on each of its two sides in the cylinder chamber, each of said partial cylinder chambers communicating permanently via at least one respective oil channel of the cylinder housing as well as via at least one respective, associated oil channel of the oil supply device with at least one respective, associated first or second oil channel of the oil control device, and wherein the oil control device has a pressure oil inlet connectable to the pressure oil source, an oil outlet as well as a change-over multiway valve between the pressure regulating valve and its first and second oil channels connected to the oil supply device for the selective connection of the first or second oil channel to the pressure regulating valve and the oil outlet, respectively.

8. The workpiece spindle device as defined in claim 7, wherein not only the first but also the second oil channel of the oil control device is provided with a pressure sensor.

9. The workpiece spindle device as defined in claim 1, wherein the pressure regulating valve is provided with an electric adjusting motor as well as a signal generator for emitting an actual-value signal corresponding to the current position of the pressure regulating valve.

10. The workpiece spindle device as defined in claim 9, wherein a hydraulic servo-drive device actuated by the adjusting motor is associated therewith for actuating the pressure regulating valve.

11. The workpiece spindle device as defined in claim 1, wherein the pressure oil storage device is dimensioned in accordance with the leakage rate of the oil supply device as well as the braking time required for stopping the workpiece spindle rotating at maximum rotational speed to be of such a size that in case of a drop in the oil pressure prevailing at the pressure oil inlet of the oil control device to almost the pressure required at the most in the clamping cylinder for a secure workpiece clamping the latter pressure is maintained until the workpiece spindle is stopped.

12. The workpiece spindle device as defined in claim 7, wherein the non-rotating housing portion of the oil supply device as well as a second housing portion of the oil supply device, said second housing portion being non-rotatably connected to the workpiece spindle and surrounded by said non-rotating housing portion with respect to the spindle axis, each has a first as well as a second oil channel, wherein two annular disk members are arranged between the two housing portions and next to one another in the direction of the spindle axis, said annular disk members surrounding the spindle axis as well as the second housing portion, wherein the first oil channels of the two housing portions communicate with one another via an oil channel of the one annular disk member and the second oil channels of the two housing portions communicate with one another via an oil channel of the other annular disk member, and wherein the two annular disk members are connected to one of said housing portions so as to be non-rotatable but subject to play in the direction of the spindle axis and are supported on the other one of said housing portions in the direction of the spindle axis via sealing gaps.

13. The workpiece spindle device as defined in claim 12, wherein the sealing gaps are located in planes extending at right angles to the spindle axis.

14. The workpiece spindle device as defined in claim 12, wherein the annular disk members are non-rotatably connected to the non-rotating housing portion.

* * * * *